United States Patent

Hendrickson

[15] 3,705,716
[45] Dec. 12, 1972

[54] MONITORING SILVER RECOVERY

[72] Inventor: Thomas N. Hendrickson, Perry, N.Y.

[73] Assignee: Eastman Kodak Company, Rochester, N.Y.

[22] Filed: July 9, 1971

[21] Appl. No.: 161,148

[52] U.S. Cl.................266/22, 204/109, 204/195 R, 75/109, 75/118
[51] Int. Cl.............................................C22b 11/00
[58] Field of Search.....75/109, 118; 204/109, 195 R; 266/22

[56] References Cited

UNITED STATES PATENTS 3,616,412  10/1971  Gnage.............................204/195 R

*Primary Examiner*—Gerald A. Dost
*Attorney*—William T. French et al.

[57] ABSTRACT

Silver is recovered from a photographic processing solution by passing the solution through a mass of steel wool in a recovery vessel. The effluent electrolyte from the vessel is then passed through a voltaic cell wherein one of the electrodes is iron in the form of steel wool. When the steel wool in the recovery vessel has lost its power to efficiently remove silver, silver ions appear in the effluent electrolyte in increasing concentration. Upon the generation of a predetermined value of electrical current in the voltaic cell representing a predetermined silver concentration, the recovery unit is disconnected and sent off for refining of the contained silver.

6 Claims, 1 Drawing Figure

PATENTED DEC 12 1972 3,705,716
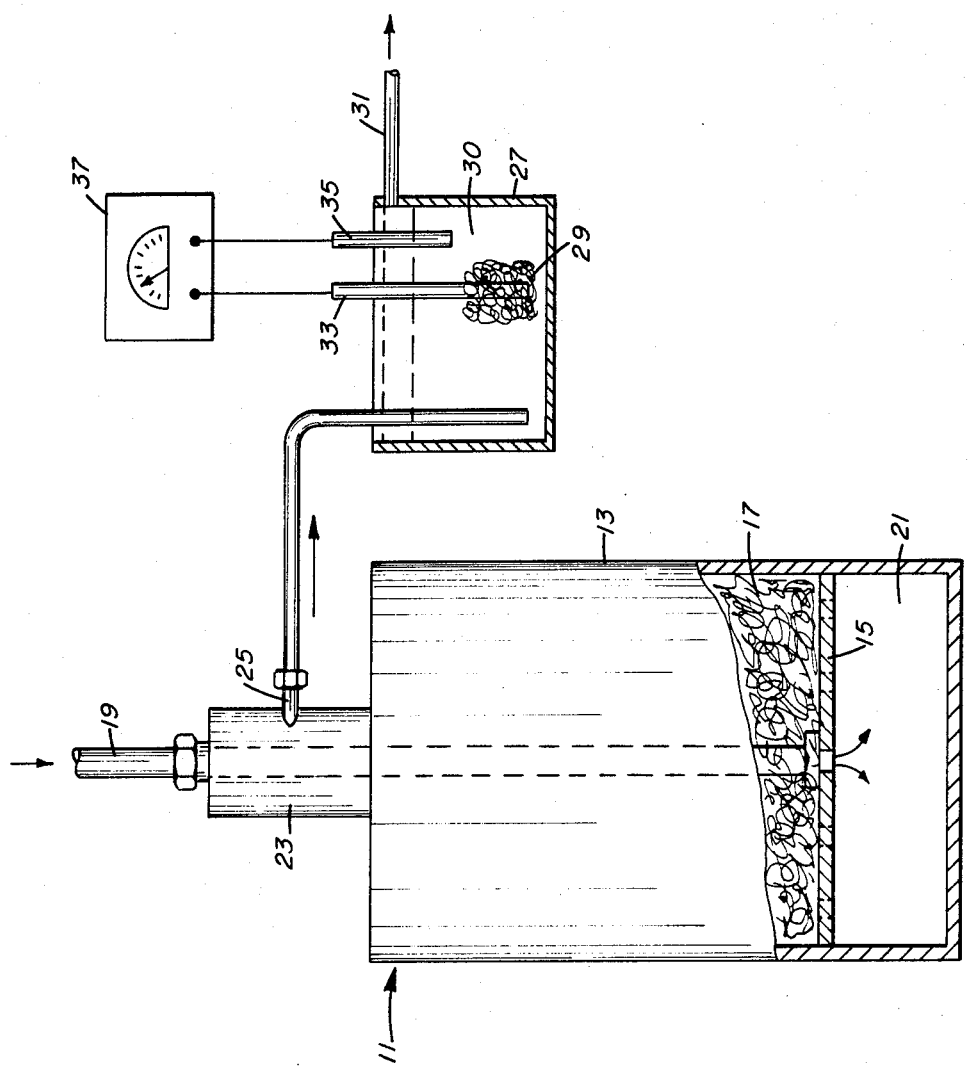
THOMAS N. HENDRICKSON
INVENTOR.
BY Henry M. Chapin
ATTORNEY

MONITORING SILVER RECOVERY

BACKGROUND OF THE INVENTION

1. Field of the Invention

The present invention relates to a novel method of and apparatus for removing silver from an electrolyte containing dissolved ionized silver compounds. More particularly, the invention is concerned with monitoring effluent from a silver recovery unit to determine when silver is being carried over in the effluent in such a concentration as to indicate that the recovery unit is no longer functioning efficiently.

2. The Prior Art

In the processing of exposed photographic plates or films various silver salts employed in the manufacture of photographic paper and film go into solution in the various aqueous fixative or stop solutions as a complex silver salt. In order to keep the processing solutions at a desired concentration it is customary to withdraw solution containing silver, and replenish with new processing solution.

In U.S. Pat. No. 3,369,801 granted to Harland G. Hartman on Feb. 20, 1968 there is described a unit for recovering silver from the withdrawn processing solutions. In that unit a vessel is packed with a metallic filler selected from the group of metals which are anodic to silver by virtue of their higher position in the electromotive force series. Iron in the form of porous steel wool formed of spun matted steel fibers has been found particularly effective.

The processing solution electrolyte containing dissolved ionized silver compounds is fed into the vessel near the bottom and rises through the steel wool packing to the top portion of the vessel, from which it is discharged. The silver in the electrolyte plates out on the steel wool packing and is replaced in solution by iron compounds formed by the exchange reaction. After it is judged that the steel wool packing is no longer capable of removing silver efficiently, the entire vessel with contained packing is removed and silver is recovered therefrom at a refinery. The time for discontinuing the recovery operation has been difficult to determine, and has been done on an intuition and experience basis prior to the present invention.

SUMMARY OF THE INVENTION

In accordance with my novel invention the time for discontinuing the flow of electrolyte into the unit for silver recovery can be determined accurately by monitoring the effluent electrolyte from the unit, as by passing the effluent into a voltaic cell containing two spaced electrodes which are immersed in the electrolyte and are connected together externally of the cell in an electrical circuit wherein the presence or absence of current flow, or the value of current flow, through the voltaic cell can be observed. A first one of the electrodes is formed of the same metal as the metallic filler in the silver recovery vessel. When this metal is steel wool, the first electrode is formed by positioning an electrically insulated water proof metal conductor in electrical contact with a similar mass of steel wool in the voltaic cell. The second electrode can be a silver bar or wire or a standard reference electrode such as a calomel electrode. There is no current flow, or only a relatively low threshold current flow, when the effluent electrolyte is essentially free of silver compounds. However, when the packing in the recovery vessel is fully loaded with silver, silver compounds begin to appear in the effluent electrolyte in increasing concentration, and at this point the voltaic cell becomes active to generate an electrical current, or additional electrical current, which flows through the external circuit and can be observed by the lighting of an incandescent bulb, or by display on a voltmeter or other instrument such as an ammeter. At this time the flow of solution through the recovery unit is discontinued and the recovery unit is disconnected and sent off for silver separation and refining.

THE DRAWING

The principles of the invention will be described more in detail with reference to the single FIGURE of the drawing which is a schematic side view, partly in elevation and partly in vertical section, of a silver recovery unit and an associated voltaic cell.

THE SPECIFIC EMBODIMENT

Referring to the drawing, a silver recovery unit 11 comprises a vessel 13 which is constructed of metal or plastic and is provided with a perforated baffle 15 spaced a short distance above the bottom of the vessel and supporting a mass 17 of steel wool packing, or a packing of other suitable metal above silver in the electromotive force series.

A liquid supply conduit 19 extends centrally into the vessel 13 through its top surface and extends down to baffle 15 through which it opens into the space 21 below the baffle for delivering silver-containing electrolyte thereto.

Electrolyte then flows up through the perforations in baffle 15 and permeates through the steel wool packing 17 to the top of the vessel from which it leaves through a central outlet 23 surrounding conduit 19, and thence through an outlet conduit 25. Silver is deposited on the steel wool and replaced in the electrolyte by iron compounds.

Effluent electrolyte from conduit 25 flows into a voltaic cell comprising a container 27 having a mass 29 of the same metal as the packing 17, such as steel wool, submerged in the electrolyte 30. Liquid then leaves the cell through an outlet conduit 31 near the top portion of the cell. Cell 27 should be constructed of a dielectric material such as glass, rubber, Bakelite or the like.

An electrode element 33 extends downwardly into the cell 27 below the surface of the electrolyte and into intimate contact with the mass of metal 29 so that, taken together, the element 33 and the metal 29 form a first electrode comprising the same metal as packing 17. Element 33 should carry a coating of rubber or other electrically insulating and waterproofing material. A second electrode 35 extends down into the cell 27 and into the electrolyte, but out of touch with the steel wool element. The two electrodes are connected together externally of cell 27 through a voltmeter 37, or a suitable load such as a lamp for indicating when current is generated in the cell and is passing through the external circuit.

No current, or only a relatively low threshold current, flows while the electrolyte in cell 27 contains no silver ions, which is the case while the packing 17 is still active for removing silver from the electrolyte and replacing it with iron. However, once silver ions start to appear in the electrolyte passing through cell 27, the generation of a current begins, or is increased above the threshold value; and as the concentration of silver ions increases, the flow of current also increases as indicated by the voltmeter 37. The recovery unit 11 is removed from the system when current flow is great enough to indicate that the steel wool packing 17 is no longer operating efficiently. For example, the recovery unit 11 can be removed when the concentration of silver in cell 27 has reached ½ gram per liter.

The relation between silver concentration in the electrolyte of cell 27 and the amount of current flow can be readily predetermined by workers in this art as a basis for deciding when to remove unit 11. For example, silver concentration can be determined by chemical analysis and plotted against voltage or amperage; or balanced with the energizing of a lamp or other indicator.

Instead of passing all the effluent from unit 11 through cell 27, intermittent sampling from a discharge line can be employed; or a continuous flow of a fraction of the effluent can be bled off from the discharge line into the cell.

The invention has been described in detail with particular reference to preferred embodiments thereof, but it will be understood that variation and modifications can be effected within the spirit and scope of the invention.

I claim:

1. In apparatus for recovering silver from an electrolyte containing silver compounds comprising a vessel, a liquid permeable metallic filler in said vessel formed from a metal above silver in the electromotive force series, an inlet conduit for supplying electrolyte to said vessel, and an outlet conduit for removing effluent electrolyte from said vessel, the improvement comprising: means connected into said outlet conduit for monitoring the silver content of said effluent electrolyte.

2. Apparatus in accordance with claim 1 wherein said means is a cell, two spaced electrodes in said cell adapted to be immersed in electrolyte, a first one of said electrodes comprising said metal above silver in the electromotive force series, an electrical circuit connecting said electrodes together externally of said cell, and a device in said electrical circuit for indicating the flow of electrical current in said circuit.

3. Apparatus in accordance with claim 1 wherein said outlet conduit is connected to said cell for continuously feeding the entire effluent electrolyte from said vessel thereto, and wherein said cell has an outlet for discharging said electrolyte continuously therefrom.

4. Apparatus in accordance with claim 2 wherein said first one of said electrodes and said metallic filler both comprise a mass of steel wool.

5. Apparatus in accordance with claim 2 wherein said device is a voltmeter.

6. Apparatus in accordance with claim 1 wherein said means comprises a cell containing two spaced electrodes, a first one of said electrodes comprising the same metal as said metallic filler, said cell being adapted to receive effluent electrolyte from said outlet conduit, and electric current indicating means externally of said cell and connected to said electrodes to complete an electrical circuit with effluent electrolyte flowing into said cell.

* * * * *